United States Patent [19]

McLane et al.

[11] Patent Number: 5,309,484
[45] Date of Patent: May 3, 1994

[54] METHOD AND APPARATUS FOR ASYNCHRONOUS TIMING RECOVERY USING INTERPOLATION FILTER

[75] Inventors: Peter J. McLane, Kingston, Canada; Sangil Park; Dion M. Funderburk, both of Austin, Tex.

[73] Assignee: Motorola, Inc., Schaumburg, Ill.

[21] Appl. No.: 939,286

[22] Filed: Sep. 1, 1992

[51] Int. Cl.[5] .............................................. H04L 7/04
[52] U.S. Cl. ..................................... 375/106; 328/63; 328/72
[58] Field of Search ................... 375/106, 111, 14, 15, 375/110; 364/724.1, 724.19, 724.2; 333/18; 328/72, 63

[56] References Cited

U.S. PATENT DOCUMENTS 4,550,415 10/1985 Debus, Jr. et al. ............... 364/724.2
5,023,825 6/1991 Luthra et al. ..................... 364/724.1

OTHER PUBLICATIONS

Siller, Jr. et al., "Decision-Directed Fractionally Spaced Equalizer Control Using Time-Domain Interpolation", IEEE Trans. on Communication, vol. 39, No. 2, Feb. 1991.
Park et al., "Analysis of the jointly adapting and asynchronously configured vol. 32 modem implementation", IEEE Comput. Soc. Press. Pacific Grove, Calif. Nov. 4-6, 1991.
Verdin et al, "Interpolation Filter structure for Asynchronous Timing recovery loops", Electronics Letters, 4th Mar. 1993, vol. 29, No. 5.
Park, S., "Digital Sample-Rate Converters," SAE Technical Paper Series, International Congress and Exposition, 1991.
Fagan, A. et al., "Implementation of a Full V.32 Modem Using a Single DSP Chip," Proceedings of ICASSP 1989, pp. 1219-1222, 1989.
Park, S. et al., "Analysis and Digital Implementation of Jointly Adapting Echo Canceller, Transversal Equalizer and Decision Feedback Equalizer for the V.32 Modem," Proc. of Int. Conf. on Acoustics, Speech and Signal Processing, Toronto, Ontario, Canada, May 14-17, 1991.
Ungerboeck, G., "Fractional Tap-Spacing Equalizer and Consequences for Clock Recovery in Data Modems," IEEE Transactions on Communications, vol. COM-24, No. 8, Aug. 1976.

*Primary Examiner*—Stephen Chin
*Assistant Examiner*—Bryan Webster
*Attorney, Agent, or Firm*—Paul J. Polansky; James L. Clingan, Jr.

[57] ABSTRACT

In an asynchronous communication system such as a V.32 modem (80), an input signal is sampled at a near-end clock rate. Each sample is then interpolated in an interpolation filter (92) to provide corresponding interpolated values. The interpolation filter (92) uses a selected one of a predetermined number of sets of windowed sinc function coefficients, each set having a successively greater phase offset. A time drift between near-end and far-end clocks is measured by tracking the coefficient shift in a passband phase-splitting, fractionally-spaced equalizer (95). When the time drift exceeds a threshold, a subsequent set of windowed sinc function coefficients is selected. When the time drift exceeds the threshold after the last set of coefficients is used, the first set is again selected and an interpolated value is either dropped or repeated in forming the far-end data samples.

20 Claims, 4 Drawing Sheets

METHOD AND APPARATUS FOR ASYNCHRONOUS TIMING RECOVERY USING INTERPOLATION FILTER

FIELD OF THE INVENTION

This invention relates generally to data communications, and more particularly, to timing recovery for asynchronous data communications systems.

BACKGROUND OF THE INVENTION

In certain data communication systems such as V.32 modems, there are two clocks that must be synchronized, known as the near-end and the far-end clocks. The near-end clock is the clock that a given station uses to transmit the data. The far-end clock is the other station's clock. For example, two stations may transmit and receive data according to the V.32 specification. V.32 specifies transmission at 9600 bits per second (bps). However, the V.32 standard allows 100 parts-per-million (ppm) or approximately 0.01% variation in clock frequency. Thus the near-end station may be transmitting data at 9601 bps while the far-end station is transmitting data at 9599 bps. A V.32 modem must be able to synchronize the data without introducing distortion and without costly circuitry.

The modem must also solve the problem of echo. A station's received signal includes not only data from the other station, known as far-end data, but also an echo due to the fact that the interface to the common transmission medium used for both reception and transmission reflects some of the transmit data's signal power back to the station. One type of echo, known as near-end echo, results from the signal power reflected by the near-end station's own interface to the transmission medium. A second type of echo, known as far-end echo, results from the signal power reflected from the far-end station's interface to the medium. The basic scheme used to cancel this echo is to substract a delayed fraction of the transmitted signal from the received signal.

A recent improvement in technology is the development of digital signal processors (DSPs), which are data processors optimized for signal processing operations. DSPs have allowed many V.32 modem functions to be performed by mathematical operations on digital data, and have reduced the number of integrated circuits required to implement a data modem to a minimum. However, known clock synchronization systems require external analog-to-digital converters (ADCs) and digital-to-analog converters (DACs) in addition to the DSP. Thus it is desirable to further reduce the number of integrated circuits required to perform signal processing functions.

SUMMARY OF THE INVENTION

Accordingly, there is provided, in one form, a method for timing recovery in asynchronous data communication systems. An input signal is sampled at a first data rate to provide a plurality of sampled input signals. Each sampled input signal is interpolated according to a selected one of a first predetermined number of finite impulse response (FIR) filters to provide a plurality of interpolated samples. A positive difference between the first data rate and a second data rate is sensed and corresponding ones of the plurality of interpolated samples are periodically dropped to provide a plurality of output samples at the second data rate in response thereto. A negative difference between the first data rate and the second data rate is sensed and corresponding ones of the plurality of interpolated samples are periodically repeated to provide the plurality of output samples at the second data rate in response thereto. A subsequent one of the predetermined number of FIR filters is selected in response to either sensing the positive difference or sensing the negative difference a second predetermined number of times. The second data rate is recovered from the plurality of output samples.

In another form, there is provided an apparatus for asynchronous timing recovery, comprising storage means, interpolation means, sample rate conversion means, equalizer means, and timing control means. The storage means stores a plurality of sets of coefficients, ordered from a first to a last, each set of coefficients delayed from a prior set by a predetermined amount. The interpolation means is coupled to the storage means, and continually interpolates an input signal, sampled by a first clock having a first clock rate, through a finite impulse response (FIR) filter using a selected one of the plurality of sets of coefficients to provide a plurality of corresponding interpolated samples. The sample rate conversion means is coupled to the interpolation means, and repeats a corresponding one of the interpolated samples in response to a repeat signal and drops the corresponding one of the interpolated samples in response to a drop signal to provide a sample-rate converted signal at a second clock rate. The equalizer means is coupled to the sample rate conversion means, recursively computes a plurality of equalization coefficients, and filters the sample-rate converted signal to provide an output signal in response thereto. The timing control means is coupled to the interpolation means, the sample rate conversion means, and the equalizer means, computes a time drift signal in response to said plurality of equalization coefficients, selects a subsequent one of the plurality of sets of coefficients in response to the time drift signal exceeding a predetermined threshold, activates the drop signal in response to a selection of a first one of the plurality of sets of coefficients when the first clock rate exceeds the second clock rate, and activates the repeat signal in response to a selection of the first one of the plurality of sets of coefficients when the second clock rate exceeds the first clock rate.

These and other features and advantages will be more clearly understood from the following detailed description taken in conjunction with the accompanying drawings.

DETAILED DESCRIPTION OF A PREFERRED EMBODIMENT

Figure 1:
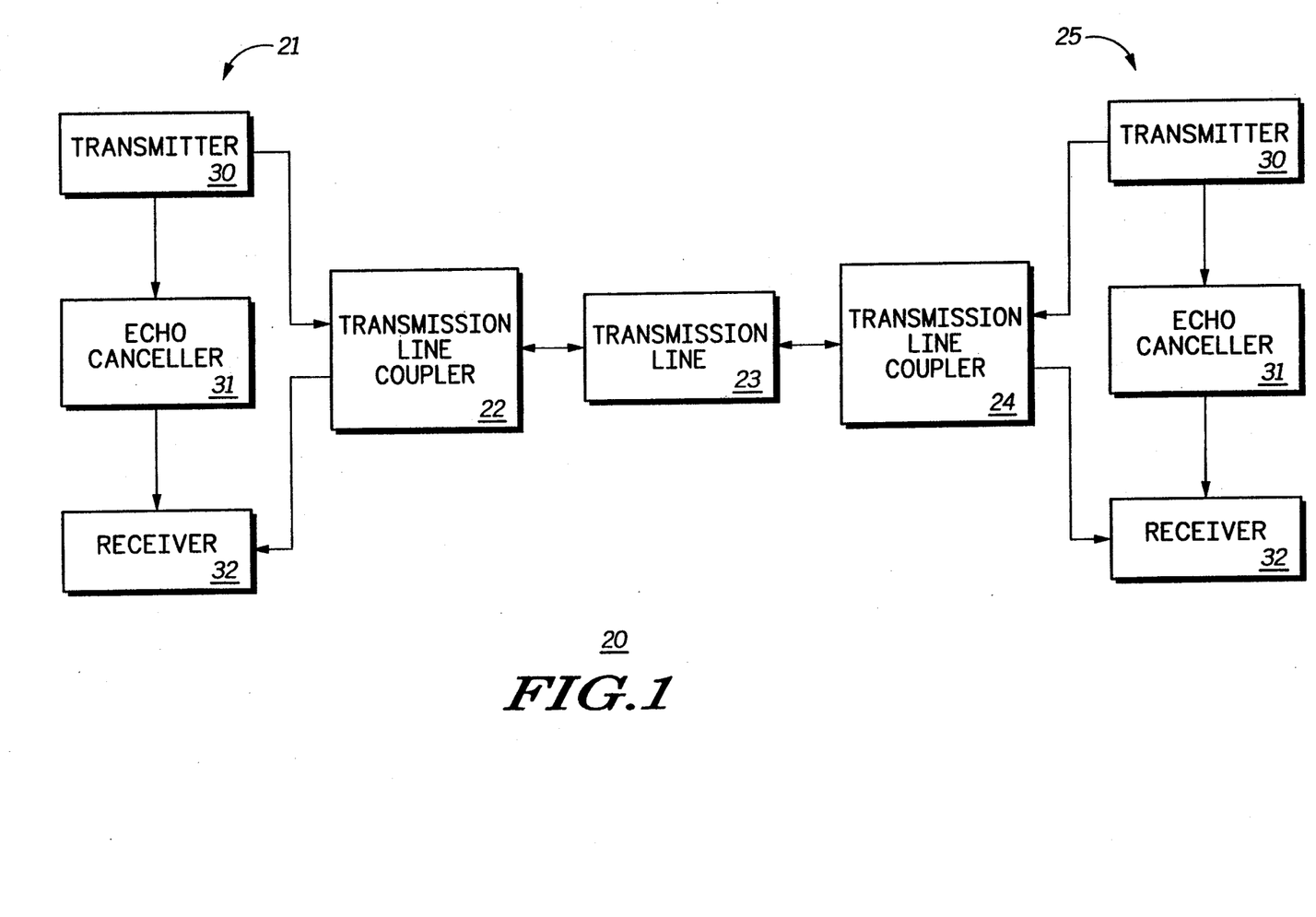
FIG. 1 illustrates in block diagram form a data communication system with asynchronous near-end and far-end data sampling.

FIG. 1 illustrates in block diagram form a data communication system 20 with asynchronous near-end and far-end data sampling. System 20 includes generally a far-end station 21, a first transmission-line coupler 22, a transmission line 23, a second transmission-line coupler 24, and a near-end station 25. The operation of system 20 will be described from the perspective of near-end station 25. However, far end station 21 is structurally identical to near-end station 25 and corresponding element are assigned the same reference numbers.

Near-end station 25 has a transmitter 30 connected to coupler 24 for transmitting data through coupler 24 onto transmission line 23 for reception by far-end station 21. Near-end station 25 also has a receiver 32 connected to coupler 24 for receiving far-end data. During transmission, coupler 24 reflects some of the signal power supplied by transmitter 30 into receiver 32. This reflected signal, called near-end echo, is synchronous with the clock of transmitter 30. In addition, coupler 22 reflects some of the signal power at the far end of transmission line 23 back through transmission line 23 and into receiver 32. This reflected signal, called far-end echo, is also synchronous with the clock of transmitter 30. Transmitter 30 also provides an output to an echo canceller 31, which delays and attenuates the transmitted data signal and provides the resulting signal to receiver 32. Receiver 32 subtracts the delayed, attenuated signal from the received data.

Receiver 32 also receives the incoming data from far-end station 21, which is asynchronous to the clock of transmitter 30. For example, for V.32 modem communication systems, each station must transmit data at 9600 bps with a tolerance of 0.01%, or approximately 9599 to 9601 bps. Ideally, receiver 32 will be able to recover the asynchronous data without introducing distortion and without using unnecessary components or data processing capability.

Three conventional sample-rate conversion techniques are commonly used for sample-rate conversion but each has drawbacks. First, a direct technique simply stores data in a data buffer at the near-end clock rate, and outputs the data at the far-end clock rate. When the two sample rates are very close to each other and the signal which will be converted has a relatively low frequency content, the resulting jitter will be small. However, when the signal has a relatively high frequency content, the output signal will exhibit discontinuities. Thus, the direct method is only useful in very low-frequency applications.

A second method is known as the M/N technique. This approach is useful when the ratio of the two samples rates can be represented by two rational numbers, M and N. M and N represent the least-common-multiple ratio of the input sampling rate to the output sampling rate. The input data is first interpolated up at a 1:M interpolation ratio. The resulting signal is successively input to a reconstruction digital filter, an anti-aliasing digital filter, and a decimator having a N:1 decimation ratio to provide the output data at the second frequency. The problem is that the M/N technique can only be used when M and N are small numbers, typically less than 10. Thus, the M/N technique is impractical for such applications as a V.32 modem which may have a 9599 Hz. near-end clock sampling 9601 bps far-end data.

Figure 2:
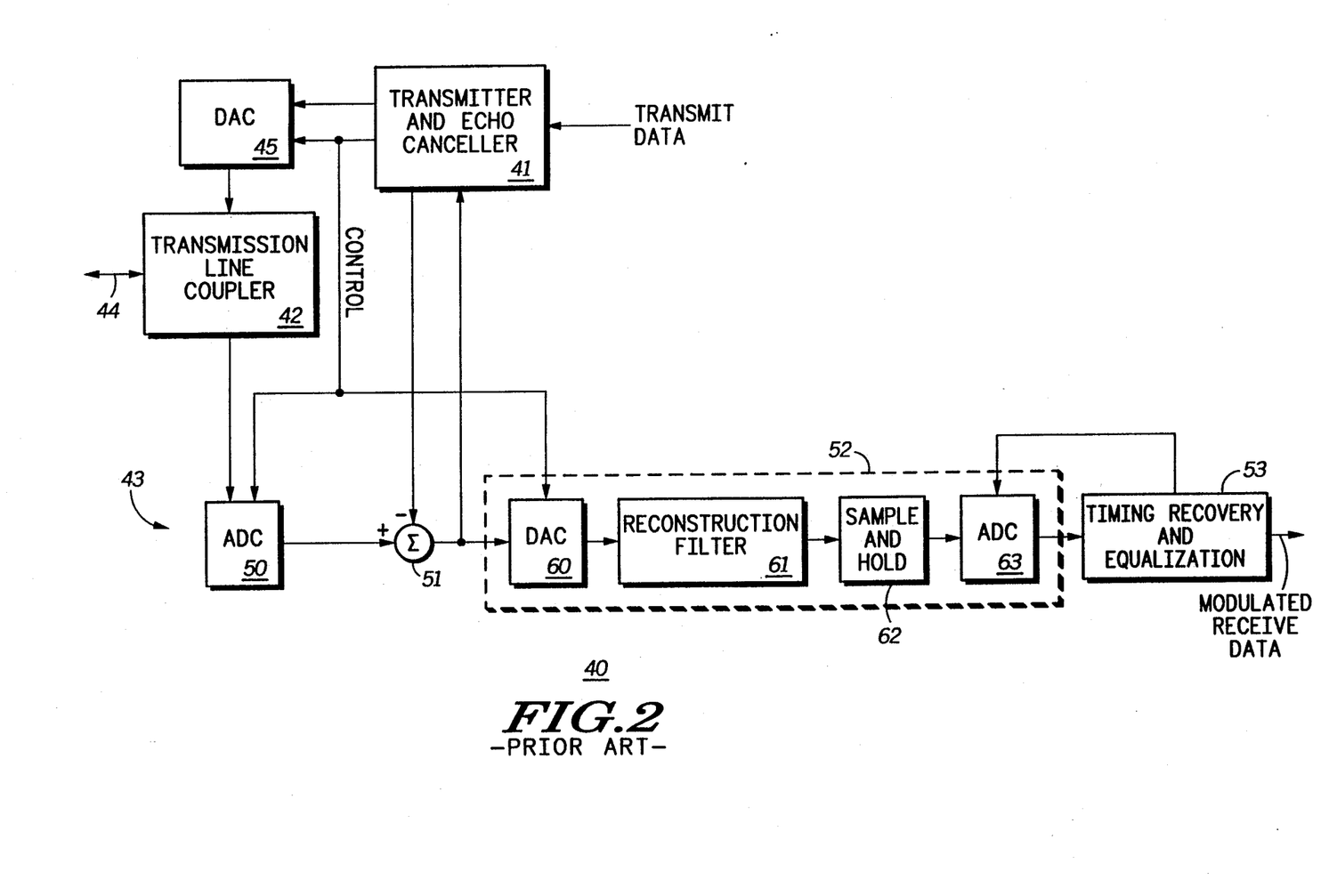
FIG. 2 illustrates in block diagram form a V.32 modem using a known sample-rate conversion technique.

A third conventional technique, known as the D/A and A/D technique, converts the digital input data to the analog domain using a digital-to-analog converter (DAC) and reclocks the data at the recovered far-end clock frequency using an analog-to-digital converter (ADC). FIG. 2 illustrates in block diagram form a V.32 modem using the D/A and A/D sample-rate conversion technique. Modem 40 includes generally a transmitter and echo canceller 41, a DAC 45, a transmission line coupler 42, and a receiver 43. Transmission line coupler 42 is connected to a transmission line 44.

Transmitter and echo canceller 41 receives digital data labelled "TRANSMIT DATA" at the near-end clock rate. In the illustrated embodiment, the near-end clock rate is 9600 Hz. with 0.01% tolerance. Transmitter and echo canceller 41 modulates TRANSMIT DATA to the carrier frequency according to the V.32 specification. The modulated signal is provided to DAC 45, which converts the modulated signal to an analog signal. Transmitter and echo canceller 41 provides a timing control signal labelled "CONTROL" which clocks DAC 45 at the near-end clock rate. DAC 45 provides the analog signal to transmission line coupler 42, which is a conventional two-wire/four-wire (2W/4W) hybrid providing a physical interface to transmission line 44.

Transmission line coupler 42 also receives a far-end signal from transmission line 44 and provides the far-end signal, along with near-end and far-end echoes, to receiver 43. Receiver 43 includes an analog-to-digital converter (ADC) 50 to convert the far-end signal and echoes to a digital representation. ADC 50 receives signal CONTROL from transmitter and echo canceller 41 with which to sample the incoming data. Since transmitter and echo canceller 41 provides CONTROL at the near-end clock rate, receiver 43 must perform sample-rate conversion to recover data at the correct (far-end) rate. However, both the near-end and far end echoes are synchronous with the near-end clock. The output of ADC 50 is thus provided to a positive input of a summing device 51. An echo canceller in transmitter and echo canceller 41 provides a negative input signal to summing device 51, and receives the output thereof as a feedback signal. The echo canceller provides delayed and attenuated versions of the modulated TRANSMIT DATA in order to cancel the corresponding echoes.

A sample rate converter 52 receives the output of summing device 51. Sample rate converter 52 uses the D/A and A/D method for sample rate conversion. Sample rate converter 52 includes a digital-to-analog converter (DAC) 60, a reconstruction filter 61, a sample and hold block 62, and an ADC 63. DAC 60 receives signal CONTROL and thus converts the output of summing device 51 into an analog signal using the near-end clock. Reconstruction filter 61 and sample and hold block 62 then provide a continuous input to ADC 63 and cancel image frequencies created by DAC 60. Then, ADC 63 reclocks the received data at the recovered far-end clock rate.

A timing and equalization block 53 receives the output of ADC 63. Timing and equalization block 53 recovers the far-end clock and provides it to ADC 63. In addition, timing and equalization block 53 eliminates adjacent symbol interference in the received data which is caused by channel distortion to provide "MODULATED RECEIVE DATA". A system which may be used for timing recovery and equalization block 53 based on a transversal equalizer and decision feedback mechanism was described by Ungerboeck, G., "Fractional Tap-Spacing Equalizer and Consequences for Clock Recovery in Data Modems," *IEEE Transactions on Communications*, vol. COM-24, no. 8, August 1976.

The principal problem with modem 40 is that sample rate converter 52 requires costly hardware circuitry. Most V.32 modem signal processing functions, like transmitter and echo canceller 41, summing device 51, and timing and equalization block 53, may be performed by software running on a digital signal processor (DSP). However, DACs and ADCs are implemented as hardware circuitry, adding to modem cost and size. For example, one DAC and one ADC are commonly available as a single separate integrated circuit. Thus, the D/A and A/D method adds a costly additional component to the modem design.

Figure 3:
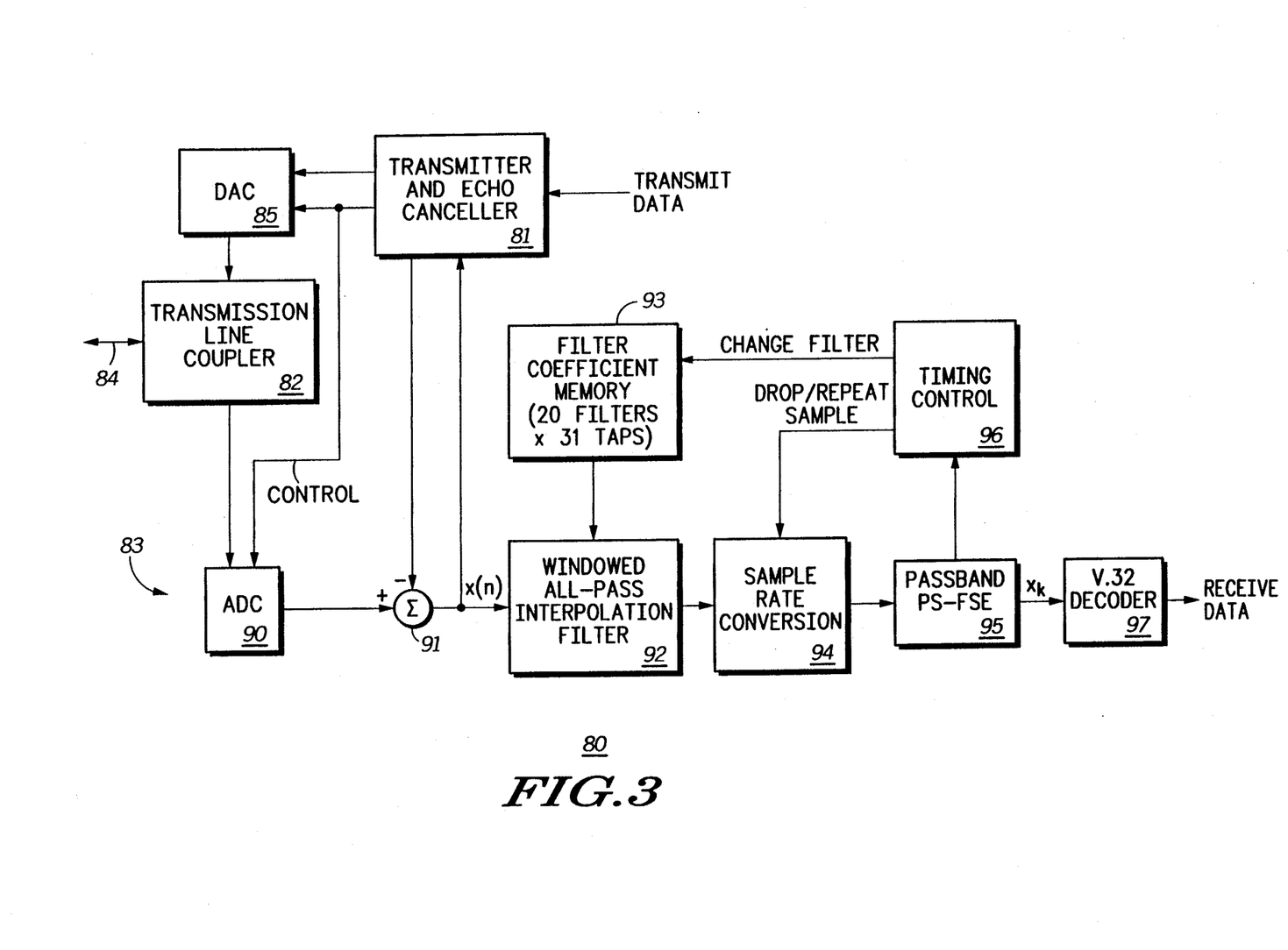
FIG. 3 illustrates in block diagram form a V.32 modem in accordance with the present invention.

FIG. 3 illustrates in block diagram form a V.32 modem 80 in accordance with the present invention. Modem 80 includes generally a transmitter and echo canceller 81, a DAC 85, a transmission line coupler 82, and a receiver 83. Transmission line coupler 82 is connected to a transmission line 84. The transmission of data and echo cancellation are performed similarly to that of modem 40.

Transmitter and echo canceller 81 receives TRANSMIT DATA at the near-end clock rate. In the illustrated embodiment, the near-end clock rate is 9600 Hz with 0.01% tolerance. Transmitter and echo canceller 81 modulates TRANSMIT DATA to the carrier frequency according to the V.32 specification. The modulated signal is provided to DAC 85, which converts the modulated signal to an analog signal. Transmitter and echo canceller 81 provides a timing control signal labelled "CONTROL" which clocks DAC 85 at the near-end clock rate. DAC 85 provides the analog signal to transmission line coupler 82, which is a conventional two-wire/four-wire (2W/4W) hybrid providing a physical interface to transmission line 84.

Transmission line coupler 82 also receives a far-end signal from transmission line 84 and provides the far-end signal, along with near-end and far-end echoes, to receiver 83. Receiver 83 includes an analog-to-digital converter (ADC) 90 to convert the far-end signal and echoes to a digital representation. ADC 90 receives signal "CONTROL" from transmitter and echo canceller 81 with which to sample the incoming data. Since transmitter and echo canceller 81 provides CONTROL at the near-end clock rate, receiver 83 must perform sample-rate conversion to recover data at the correct (far-end) rate. However, both the near-end and far end echoes are synchronous with the near-end clock. The output of ADC 90 is provided as a positive input to a summing device 91. An echo canceller in transmitter and echo canceller 41 provides a negative input signal to a summing device 91, and receives the output thereof as a feedback signal. The echo canceller provides a delayed and attenuated version of the modulated TRANSMIT DATA in order to cancel the echo. Summing device 91 provides a substantially echo-free signal labelled "x(n)" sampled at the near-end rate.

Modem 80, however, reduces the amount of integrated circuit hardware required by eliminating the need for DAC 60 and ADC 63 used in modem 40 of FIG. 2. Receive data and clock recovery are performed using software running on a conventional digital signal processor (DSP) (not shown in FIG. 3). Other methods of implementing data and clock recovery include firmware or microcode running on a DSP, hardware circuitry which may require less integrated circuit area than DAC 60 and ADC 63 in modem 40, or combinations thereof.

The output of summing device 91 is provided to a windowed, all-pass interpolation filter 92. Interpolation filter 92 passes signal x(n) through a causative, 31-tap FIR filter having a sinc(x) response multiplied by a Hanning window function. In modem 80, the particular window function used is not critical, and other known window functions, such as the Blackman-Harris window function, may be used.

The coefficients for interpolation filter 92 are provided as a selected one of twenty sets of filter coefficients stored filter coefficient memory 93. Each set of filter coefficients in memory 93 includes coefficients of a windowed sinc(x) function in which the coefficients are phase-shifted relative to the preceding set of coefficients. The first filter in memory 93 includes coefficients of the windowed sinc(x) function perfectly-centered around the center tap (i.e., tap 16). The second entry includes coefficients of the windowed sinc(x) function which are slightly delayed; i.e., the maximum value is slightly to the right of the center tap. For a set of twenty filters, the delay between filters is 0.05 of the normalized sampling period. Subsequent filters add increasing delays and shift the maximum value with an increasing delay from the center tap; the twentieth filter represents a windowed sinc(x) function with a maximum value 0.05 normalized sampling periods to the left of tap 17. By having a tap length of 31, modem 80 meets the V.32 timing standard. Memory 93 receives a control input labelled "CHANGE FILTER" which selects each filter in order. When the twentieth filter is selected and CHANGE FILTER is activated, memory 93 again selects the first filter.

A sample rate conversion block 94 receives the output of interpolation filter 92 and provides an output signal at the recovered far-end clock rate. Sample rate conversion block 94 receives a control input labelled "DROP/REPEAT SAMPLE" from a timing control block 96 which controls which interpolated samples are to be included in developing the output signal thereof. Sample rate conversion block 94 provides the output signal to a passband phase-splitting, fractionally-spaced equalizer (PS-FSE) 95.

Equalizer 95 continuously receives the output provided by sample rate conversion block 94, passes this signal through an FIR filter, and provides a signal labelled "$x_k$" to a V.32 decoder 97. Equalizer 95 processes the received signal to compensate for any nonlinearity associated with the channel and any analog hardware circuitry. Equalizer 95 also recursively updates its filter coefficients and provides these coefficients to a timing control block 96.

Timing control block 96 compares the energy in the signal around the filter's center tap. Thus, timing control block 96 is able to sense the change in phase over time, which is equivalent to sensing a sampling frequency difference. Timing control block 96 controls interpolation filter 92 and sample rate conversion block 94 to correctly interpolate signal x(n) so as to provide signal $x_k$ at the correct far-end timing. Timing control block 96 provides control signals CHANGE FILTER to memory 93 and DROP/REPEAT SAMPLE to sample rate conversion block 94.

If timing control block 96 senses that the near-end clock rate is faster than the far-end clock rate, then timing control block 96 periodically activates CHANGE FILTER to cause memory 93 to provide coefficients for a subsequent FIR filter to filter 92. When timing control block 96 activates CHANGE FILTER after memory 93 has been providing coefficients for the twentieth filter, memory 93 again provides the first filter coefficients. In addition, timing control block 96 activates DROP SAMPLE, thereby completing the sample rate conversion.

On the other hand, if the near-end clock rate is slower than the far-end clock rate, then timing control block 96 activates CHANGE FILTER as above. However, interpolation filter 92 uses the symmetry of the windowed sinc(x) function to mirror the coefficients around the center tap and cause a leftward shift of the maximum value of the windowed sinc(x) function. When timing control block 96 activates CHANGE FILTER after memory 93 has been providing coefficients for the twentieth filter, memory 93 again provides the first filter coefficients. In addition, timing control block 96 activates REPEAT SAMPLE, thereby completing the sample rate conversion.

The function of the various blocks used in clock recovery and sample rate conversion may be represented mathematically. Let x(n) represent samples from ADC 90 taken at a sample rate of $f_s = 1/T_s$, where $T_s$ is the near-end sample period. By the sampling theorem, the time-domain signal x(t) can be obtained from its samples:

$$x(t) = \Sigma x(n)\, \text{sinc}[(t - nT_s)/T_s] \qquad [1]$$

where x(t) is the time-varying signal at time t, x(n) is the nth sample, $\text{sinc}(x) = \sin(x)/\pi x$, and the summation over n is from $-\infty$ to $\infty$. Now let $t = kT_s'$, $T_s' = T_s + \epsilon$, where $T_s'$ represents the far-end clock period and $\epsilon$ represents a difference between the near-end and far-end sampling periods. The time-varying signal can then be expressed as:

$$x[k(T_s + \epsilon)] = \Sigma x(n)\, \text{sinc}(k - n + \epsilon') \qquad [2]$$

where $\epsilon' = k\epsilon/T_s$. Equation [2] can be rewritten as $$x[k(T_s + \epsilon)] = x(n) * h(n) \qquad [3]$$

where * represents convolution, and $$h(\epsilon') = \text{sinc}(n + \epsilon') \qquad [4]$$

Thus, a resampling of x(n) can be realized by having x(n) as an input to an FIR filter with an impulse response as given by equation [4]. This filter has an all-pass frequency characteristic and an infinite number of taps. Just a phase offset is introduced to produce the required time delay. The impulse response may be truncated to a low number of tap gains, and with the application of a window function, filter 92 provides effective sample rate conversion. Filter 92 has an overall impulse response of $$h(\epsilon') = \text{sinc}(n + \epsilon')w(n + \epsilon') \qquad [5]$$

where w(n) represents the windowing function. In the illustrated embodiment, the Hanning window was used. This represents just a signal filter, however, and to accommodate a varying symbol frequency offset a polyphase filter bank is stored in memory 93. Memory 93 includes filters for a delay ranging from $0.05T_s$ to $T_s$ in increments of $0.05T_s$. The size of the increments may be varied depending on the requirements of the application.

A PS-FSE was taught by Mueller, K. and Werner, J., "A Hardware Efficient Equalizer Structure for Data Transmission," *IEEE Transactions of Communication*, vol. COM-30, pp. 538–541, March 1982. Equalizer 95 is a T/3-tap spaced PS-FSE which minimizes both the passband mean-squared error with respect to equalizer tap gains, and the phase required for carrier recovery. The real, passband input to equalizer 95 is given by $$x_k = x(kT/3) = Re\{\Sigma z(m) f(nT/3 - mT) e^{j\phi_0 n}\} + n(k) \qquad [6]$$

where z(m) are the V.32 data symbols, f(·) is the complex baseband channel impulse response, $\omega_0$ is the sampled carrier angle (including a $\pm 1$ Hz offset), $n_k$ is channel noise, and the summing interval is over all values of m. An error for equalizer and carrier recovery estimates is $$e_k = z_k e^{j(\phi_0 k + \theta_e k)} - (C \cdot X)_k \qquad [7]$$

where $(C \cdot X)_k$ is the output of equalizer 95 at a discrete time k, X is a vector of samples $x_k$ as defined in equation [1] (the equalizer state vector), and C is the equalizer tap gain vector. The recursive updates of $C_k$ and $\theta_k$ are:

$$C_{k'+1} = C_{k'} + \Delta e_{k'} X_{k'} \qquad [8]$$

$$\theta_{k'+1} = \theta_{k'} + \Delta_p IM[(C \cdot X)_{k'} z_{k'}^+] \qquad [9]$$

where $$z_{k'}^+ = z_{k'} e^{j(\phi_0 k + \theta_e k)} \qquad [10]$$

k' is every third sample, IM(z) is the imaginary part of a complex number, $\Delta$ is the step size of equalizer 95, and $\Delta_p$ is the phase-updated step size. $z_k$ is either known training data or an early decision of $z_k$.

Timing control is suppressed for a training period of 200 symbols following the start of transmission. When clock drift occurs after the training period, a specific time variation is introduced into the channel impulse response, which causes the tap gains to drift relative to the center tap corresponding to the time drift between the near-end and far-end clocks. The drift D is determined by the following:

$$D = -\Sigma |C_i|^2 + \Sigma |C_i|^2 \qquad [11]$$

where $M = N/2$, N is the number of taps, 2 L is the number of terms used for timing correction relative to the center tap, the first summing interval is from $(M - L)$ to M, and the second summing interval is from $(M + 1)$ to $(M + L)$. $M = N/2$ is best for use with a passband filter such as filter 92. With the phase difference, labelled "$\tau$", increasing, the tap gains shift right in distribution, which produces $D > 0$ and the timing update is thus $$\tau_{(k'+1)} = \tau_{k'} - \Delta_T D \qquad [12]$$

where $\Delta_T$ is the step size. In the illustrated V.32 modem, $\tau_{k'}$ is quantized into intervals of 0.05 normalized to the sampling period. When $|\tau_{(k'+1)}|$ crosses the threshold of 0.05, timing control block 96 causes memory 93 to provide a new interpolation filter.

Figure 4:
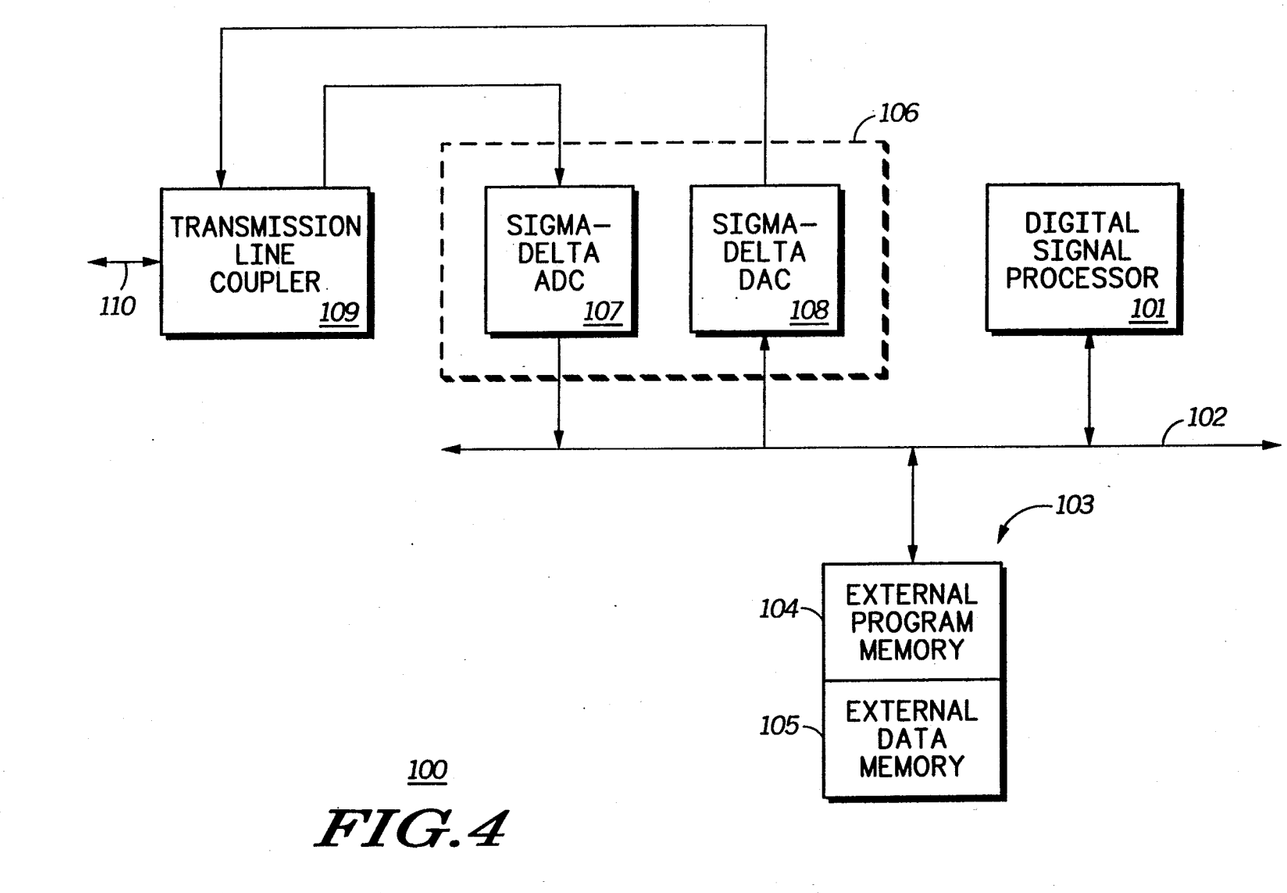
FIG. 4 illustrates a block diagram of a data processing system implementing the V.32 modem of FIG. 3.

FIG. 4 illustrates a block diagram of a data processing system 100 implementing the V.32 modem of FIG. 3. Data processing system 100 includes a digital signal processor 101 connected to a communication bus 102 for conducting address, data, and control information therebetween. An external memory 103, including an external program memory 104 and an external data memory 105, is also connected to bus 102. External data memory 105 includes memory 93 of modem 80. A sigma-delta type ADC 107 and a sigma-delta type DAC 108 which may be part of a single integrated circuit 106 are also connected to bus 102. DAC 108 is part of transmitter and echo canceller 81 of FIG. 3, and receives data via bus 102 and provides an analog signal to a transmission line coupler 109. Transmission line coupler 109 is also connected to a transmission line 110 for transmission and reception of data. Far-end data is also conducted on transmission line 110 and provided by transmission line coupler 109 to sigma-delta ADC 107. ADC 107 performs the function of ADC 90 of modem 80, and provides data to bus 102.

Except for ADC 107 and DAC 108, which are part of the receiver and transmitter, respectively, data processing system 100 performs all the functions of a V.32 modem in software stored in external program memory 104. Filter coefficients and other data are stored in external data memory 105. By contrast, modem 80 of FIG. 3 illustrated a functional block diagram of a V.32 modem. In an actual software implementation, various signals such as the far end clock are inherently developed from the program flow and are never be explicitly stored or further processed.

DSP 101 is a conventional digital signal processor such as the Motorola DSP 56001 or the like. The software used to implement modem 80 in data processing system 100 is listed in APPENDIX A. However, it should be apparent to those skilled in the art that other software may be used. In addition, different combinations of hardware and software may be used. Preferably, data processing system 100 implements all the functions of a modem on a single integrated circuit.

While the invention has been described in the context of a preferred embodiment, it will be apparent to those skilled in the art that the present invention may be modified in numerous ways and may assume many embodiments other than that specifically set out and described above. For example, different combinations of hardware circuitry and software or microcode executed by a DSP may be used to implement modem 80. In addition, different windowing functions may be used to form coefficients for interpolation filter 92. Accordingly, it is intended by the appended claims to cover all modifications of the invention which fall within the true spirit and scope of the invention.

```
                            APPENDIX A
;**************************************************************
;                        TIMING ALGORITHM
;**************************************************************
;*** CONSTANTS ***
ntapstime       equ    620      ;pre-loaded interpolation filter coefficients
tdata           equ    31       ;received input data
time_convg      equ    0.005    ;timing convergence factor
time_bound      equ    0.05     ;timing threshold value
;*** X-MEMORY ***
                org    x:$
neg_delta       ds     1        ;filter bank indicator -when set h (t−τ)
                                ;filters are in use
drop_samp       ds     1        ;drop sample indicator
add_samp        ds     1        ;add sample indicator
train_mode      ds     1        ;training mode indicator
receive         ds     1        ;current receiver input
equcoef         dsm    120      ;equalizer coefficients
tmecoef         dsm    620      ;timing interpolation coefficients
;*** Y-MEMORY ***
                org    y:$
time_func       ds     1        ;current value of timing function
filter_ptr      ds     1        ;pointer to timing coefficients
tmg_data        ds     1        ;pointer to received input data
dval_start      ds     1        ;value of D function at training
dval_curr       ds     1        ;current value of D function
timedata        dsm    31       ;receiver input timing data
;*** INITIALIZATION ***
        move    #timedata,r4
        move    #timecoef,r0
        move    r4,y:tmg_data
        move    r0,y:filter_ptr
;*** MAIN PROGRAM SEGMENT ***
        jsr     calc_time
        move    #tdata-1,m4
        move    y:tmg_data,r4
        move    y:receive,a
        move    a,y:(r4)
        jsr     timng_filt
        move    r4,y:tmg_data
;*** TIMING SUBROUTINES ***
;This routine implements the timing interpolation filters.
timng_filt
        move    #ntapstime-1,m0
        move    y:filter_ptr,r0                    ;be stored already
        move    #31,n0                             ;r0 points to interpolation coefficients
        jset    #23,x:neg_delta,switch             ;if bit is not set
        clr     a       x:(r0)+,x0   y:(r4)+,y0    ;implement h(t − τ)
        rep     #30                                ;filters
        mac     x0,y0,a x:(r0)+,x0   y:(r4)+,y0
        jmp     to_end
```
; expects input data (pointed to by r4) to -continued

```
switch      clr     a        x:(r0)-,x0   y:(r4)+,y0   ;if bit set implement
            rep     #30                                ;h(t - τ) filters
            mac     x0,y0,a  x:(r0)-,x0   y:(r4)+,y0
to_end      macr    x0,y0,a  (r4)-
            jclr    #0,x:add_samp,nochnge              ;if time to add sample advance
            move    y:filter_ptr,r0                    ;interpolation filter pointer and
            move    (r4)+                              ;store
            move    (r0)+n0                            ;keep same input data by moving
            nop                                        ;pointer back by one
            move    r0,y:filter_ptr
nochnge     rts
;This routine implements the timing control function (Δτ_{k+1} = Δτ - δ(D_0))
calc_time
            move    y:filter_ptr,r4                    ;set r4 to point at interpolation
            move    #ntapstime-1,m4                    ;filters
            move    y:dval_start,x0                    ;calculate D - D_0
            move    y:dval_curr,b
            sub     x0,b     #>time_convg,x1
            move    b,y0                               ;multiply D-D_0 by convergence
                                                       ;factor
            mpy     x1,y0,b  y:time_func,a             ;then subtract it from previous
            sub     b,a      #time_bound,y1            ;timing function result and store
            move    a,y:time_func                      ;new result
            cmpm    y1,a                               ;compare result to threshold
            jlt     no_chnge                           ;if greater than threshold call
            jsr     swap                               ;routine to change interpolation
            clr     b                                  ;filters and reset timing result to
            move    b,y:time_func                      ;zero and save
no_chnge    rts
;This routine changes interpolation filters. If the filter pointer is at
;the first filter it sets up the pointer to operate with the appropriate
;set of filters and if the pointer is at the last filter it sets a bit to
;indicate that an interpolation output must be added or dropped
swap        move    r4,b                               ;check for first (0) filter
            move    #tmecoef+$1e,x0
            cmp     x0,b                               ;if first filter make sure
            jgt     not_first                          ;correct set of filters are being
            jsr     sign_check                         ;used
            jmp     swtch                              ;jump to filter switch
not_first
                                                       ;if not first filter find out which direction
            move    x:neg_delta,x0                     ;to move within filter bank - if sign of
            eor     x0,a                               ;filter bank indicator does not agree with
            jset    #23,a1,other_way                   ;sign of current timing function
                                                       ;value go
            move    #time_coef+$24d,x0                 ;other way in filter bank.
            cmp     x0,b                               ;check to see if at last filter
            jlt     swtch
            jset    #23,x:neg_delta,bottom             ;if h(t + τ) filter bank drop sample
            bset    #0,x:drop_samp                     ;indicator set
            jmp     swtch
bottom      bset    #0,x:add_samp                      ;if h(t - τ) filter bank add sample
            jmp     tm_done                            ;indicator set (and filter change
                                                       ;not made)
swtch       move    #31,n4                             ;move forward through current
            nop                                        ;filter bank
            move    (r4)+n4
            jmp     tm_done
other_way
            move    (r4)-n4                            ;move backwards through current
            nop                                        ;filter bank
tm_done
            move    r4,y:filter_ptr                    ;save interpolation filter pointer
            rts
;This routine sets up the interpolation filter pointer to move through
;the appropriate filter bank. This is done by comparing the sign of
;the current timing function result (in 'a' accumulator) and the filter
;bank indicator. If the signs are the same then no change is made otherwise
;the filter bank indicator is set or cleared and the filter pointer is
;changed
sign_check
            move    #30,n4
            jclr    #23,a1,positive
            jset    #23,x:neg_delta,okay
            move    (r4)+n4                            ;set filter pointer for h(t - τ) case
            bset    #23,x:neg_delta                    ;set filter bank indicator
            jmp     okay
positive    jclr    #23,x:neg_delta,okay
            move    (r4)-n4                            ;set filter pointer for h(t + τ) case
            bclr    #23,x:neg_delta                    ;clear filter bank indicator
okay        rts
;This routine calculates the 'D' function from the equalizer coefficients
timing      move    #equcoef,r6                        ;point to equalizer coefficients
```

-continued

```
        clr     b    #>equcoef+$1e,y1        ;m6 and n6 are set before routine
        do      #ntapsequ,sum_taps           ;is called
        move    y:(r6),x0                    ;calculate complex tap gains
        mac     x0,x0,b y:(r6+n6),y0
        mac     y0,y0,b r6,a
        cmp     y1,a (r6)+                   ;if half way through filters
        jne     sum                          ;negate sum of complex tap gains
        neg     b
sum     nop                                  ;output in a
sum_taps
        jset    #0,x:train_mode,not_d0       ;if in training mode D=D0
        move    b,y:dval_start
not_d0  move    b,y:dval_curr
finish  rts
```

We claim:

1. A method for timing recovery in asynchronous data communication systems, comprising the steps of:
   sampling an input signal at a first data rate to provide a plurality of sampled input signals;
   interpolating each sampled input signal according to a selected one of a predetermined number of finite impulse response (FIR) filters to provide a plurality of interpolated samples;
   sensing a positive difference between said first data rate and a second data rate and periodically dropping corresponding ones of said plurality of interpolated samples and providing a plurality of output samples at said second data rate in response thereto;
   sensing a negative difference between said first data rate and said second data rate and periodically repeating corresponding ones of said plurality of interpolated samples and providing said plurality of output samples at said second data rate in response thereto;
   selecting a subsequent one of said predetermined number of FIR filters in response to either sensing said positive difference or sensing said negative difference for a second predetermined number of times; and
   recovering said second data rate from said plurality of output samples.

2. The method of claim 1 wherein the step of sampling said input signal further comprises the step of sampling said input signal at said first data rate to provide said first plurality of samples in an analog-to-digital converter.

3. The method of claim 1 wherein the step of interpolating further comprises the step of interpolating said first plurality of samples according to a selected one of a second predetermined number of finite impulse response (FIR) filters having a third predetermined number of coefficients of a windowed sinc function to provide said second plurality of samples.

4. The method of claim 3 wherein the step of interpolating further comprises the step of interpolating said first plurality of samples according to a selected one of twenty finite impulse response (FIR) filters.

5. The method of claim 4 wherein the step of selecting further comprises the step of selecting a subsequent one of said predetermined number of FIR filters, said windowed sinc function of each FIR filter offset from said windowed sinc function of a preceding FIR filter by a predetermined offset, said windowed sinc function of a first FIR filter having a maximum value at a center tap thereof, said windowed sinc function of a last FIR filter having a maximum value at a tap subsequent to said center tap.

6. The method of claim 5 wherein said step of interpolating further comprises the step of mirroring coefficients of said selected one of said first predetermined number of FIR filters about a center tap in response to a negative difference between said first data rate and said second data rate, and interpolating said first plurality of samples according to said mirrored coefficients of said selected FIR filter to provide said corresponding plurality of interpolated samples.

7. The method of claim 3 wherein the step of interpolating further comprises the step of interpolating said first plurality of samples according to said selected one of said second predetermined number of finite impulse response (FIR) filters having thirty-one coefficients of a windowed sinc function to provide said second plurality of samples.

8. The method of claim 1 further comprising the step of performing each of said steps of sensing said positive difference between said first data rate and said second data rate, sensing said negative difference between said first data rate and said second data rate, and recovering said second data rate, in a passband phase-splitting, fractionally-spaced equalizer (PS-FSE).

9. A method for timing recovery in asynchronous data communication systems, comprising the steps of:
   receiving a plurality of input samples at a first rate;
   interpolating each of said plurality of input samples through a finite impulse response (FIR) filter to provide a corresponding plurality of interpolated samples, coefficients of said FIR filter being a selected one of a predetermined number of sets of coefficients;
   providing output samples at a second rate in response to said plurality of interpolated samples;
   measuring a drift in time between a first clock at said first data rate and a second clock at said second data rate;
   selecting a subsequent one of said predetermined number of sets of coefficients in response to said drift exceeding a predetermined threshold;
   dropping one of said plurality of interpolated samples in response to said first data rate exceeding said second data rate;
   repeating one of said second plurality of samples to provide said output signal at said second data rate in response to said second data rate exceeding said first data rate; and
   recovering said second data rate from said plurality of output samples.

10. The method of claim 9, wherein the step of interpolating further comprises the step of interpolating each of said plurality of input samples through said finite impulse response (FIR) filter to provide said corresponding plurality of interpolated samples, coefficients of said FIR filter being a selected one of a predetermined number of sets of coefficients of a windowed sinc function.

11. The method of claim 10, wherein the step of interpolating further comprises the step of interpolating each of said plurality of input samples through said finite impulse response (FIR) filter to provide said corresponding plurality of interpolated samples, coefficients of said FIR filter being a selected one of a predetermined number of sets of coefficients of a windowed sinc function, said predetermined number of sets of coefficients of said sinc function ordered from a first set to a last set, a sinc function for each set having a maximum value offset from a preceding set.

12. The method of claim 9, wherein the step of interpolating further comprises the step of interpolating each of said plurality of input samples through said finite impulse response (FIR) filter to provide said corresponding plurality of interpolated samples, coefficients of said FIR filter being a selected one of twenty sets of coefficients of a windowed sinc function.

13. The method of claim 9, wherein the step of interpolating further comprises the step of interpolating each of said plurality of input samples through said finite impulse response (FIR) filter to provide said corresponding plurality of interpolated samples, coefficients of said FIR filter being a selected one of a predetermined number of sets of thirty-one coefficients of a windowed sinc function.

14. The method of claim 9, wherein the step of measuring further comprises the step of measuring said drift in time between said first clock at said first data rate and said second clock at said second data rate using a passband phase-splitting, fractionally spaced equalizer (PS-FSE).

15. A method for timing recovery in asynchronous data communication systems, comprising the steps of:
repetitively receiving an input sample at an input clock rate;
interpolating said input sample through a finite impulse response (FIR) filter to provide a corresponding interpolated sample, coefficients of said FIR filter being a selected one of a predetermined number of sets of coefficients;
providing an output sample in response to said corresponding interpolated sample if a drop signal is inactive;
repeating said output sample in response to a repeat signal being active;
recovering an output clock in response to said output sample;
measuring a drift in phase between said input clock rate and said output clock rate in response to said output sample;
selecting a subsequent one of said predetermined number of sets of coefficients in response to said drift exceeding a predetermined threshold;
activating said drop signal in response to said selected one of said predetermined number of sets of coefficients being a first one and said input clock rate exceeding said output clock rate; and
activating said repeat signal in response to said selected one of said predetermined number of sets of coefficients being said first one and said output clock rate exceeding said input clock rate.

16. A method for timing recovery in asynchronous data communication systems, comprising the steps of:
storing a first predetermined number of sets, of a second predetermined number of coefficients, of a windowed sinc function in a memory, said first predetermined number of sets of coefficients ordered from a first set to a last set, a maximum value of said windowed sinc function of said first set being at a center tap thereof, maximum values of subsequent sets of said windowed sinc function offset from a previous set by a predetermined offset;
selecting said first set of coefficients;
repeatedly passing an input signal sampled at a first rate through a finite impulse response (FIR) filter having said selected set of coefficients to provide a corresponding plurality of interpolated samples;
forming an output sample at a second rate from a corresponding interpolated sample;
recovering said second rate from a plurality of said output samples;
sensing a positive time drift between said input signal sampled at said first rate and said output signal formed at said second rate exceeding a predetermined threshold, and dropping a corresponding interpolated sample in response thereto;
sensing a negative time drift between said input signal sampled at said first rate and said output signal formed at said second rate exceeding a predetermined threshold, and repeating a corresponding interpolated sample in response thereto; and
selecting a subsequent one of said plurality of sets of coefficients in response to either sensing said positive time drift or sensing said negative time drift a predetermined number of times.

17. An apparatus for asynchronous timing recovery, comprising:
storage means for storing a plurality of sets of coefficients, ordered from a first to a last, each set of coefficients delayed from a prior set by a predetermined amount;
interpolation means coupled to said storage means, for continually interpolating an input signal, sampled by a first clock having a first clock rate, through a finite impulse response (FIR) filter using a selected one of said plurality of sets of coefficients to provide a plurality of corresponding interpolated samples;
sample rate conversion means coupled to said interpolation means, for repeating a corresponding one of said interpolated samples in response to a repeat signal, and for dropping said corresponding one of said interpolated samples in response to a drop signal, to provide a sample-rate converted signal at a second clock rate;
equalizer means coupled to said sample rate conversion means, for recursively computing a plurality of equalization coefficients, and for filtering said sample-rate converted signal to provide an output signal in response thereto; and
timing control means coupled to said interpolation means, said sample rate conversion means, and said equalizer means, for computing a time drift signal in response to said plurality of equalization coefficients, for selecting a subsequent one of said plurality of sets of coefficients in response to said time drift signal exceeding a predetermined threshold, for activating said drop signal in response to a selection of a first one of said plurality of sets of coefficients when said first clock rate exceeds said second clock rate, and for activating said repeat signal in response to a selection of said first one of said plurality of sets of coefficients when said second clock rate exceeds said first clock rate.

18. The apparatus for asynchronous timing recovery of claim 17, wherein each set of coefficients comprises coefficients of a windowed sinc function.

19. The apparatus for asynchronous timing recovery of claim 17, wherein said equalizer means is a passband phase-splitting, fractionally spaced equalizer (PS-FSE).

20. An apparatus for asynchronous timing recovery, comprising:

a memory for storing a plurality of sets of coefficients, ordered from a first set to a last set, each set of coefficients delayed from a prior set by a predetermined amount, a subsequent coefficient selected in response to a change filter signal;

a finite impulse response (FIR) filter having an input for receiving an input signal at a first clock rate, a coefficient input for receiving a selected one of said plurality of sets of coefficients from said memory, and an output;

a sample rate converter having an input coupled to said output of said FIR filter, a control input for receiving a drop sample signal and a repeat sample signal, and an output for providing an output signal;

an equalizer having an input coupled to said output of said sample rate converter, a first output for providing an output signal at a second clock rate, and a second output for providing a plurality of coefficients thereof; and timing control means coupled to said memory, said sample rate converter, and said equalizer, for calculating a time drift signal in response to said plurality of coefficients, for activating said change filter signal in response to said time drift signal exceeding a predetermined threshold, for activating said drop sample signal in response to a selection of said first set of coefficients of said memory when said first clock rate exceeds said second clock rate, and for activating said repeat sample signal in response to said selection of said first set of coefficients of said memory when said second clock rate exceeds said first clock rate.

* * * * *